Patented Nov. 1, 1927.

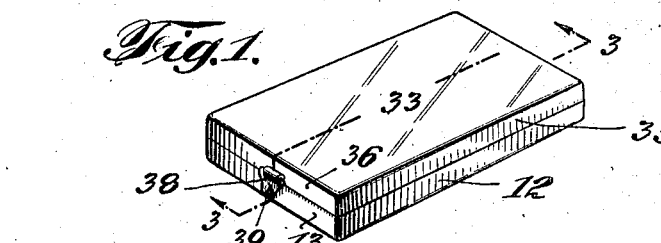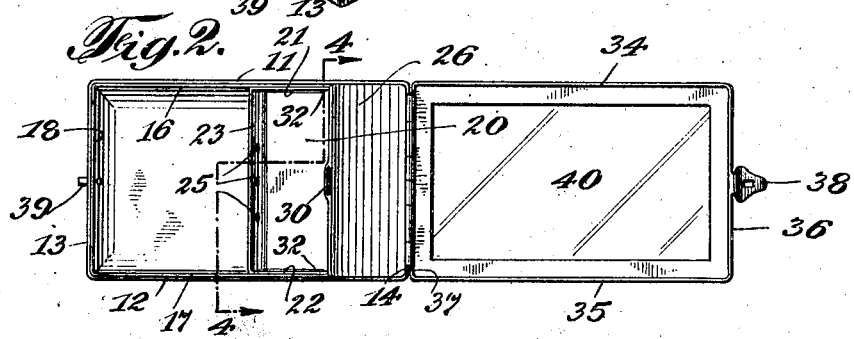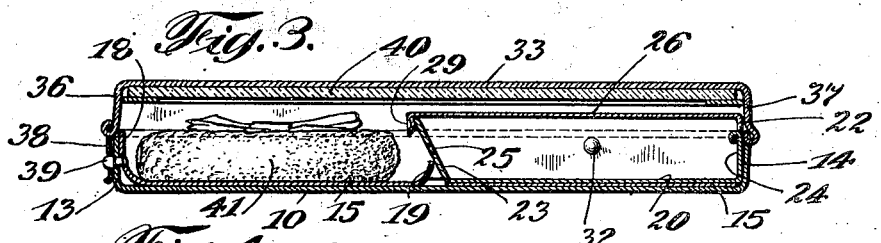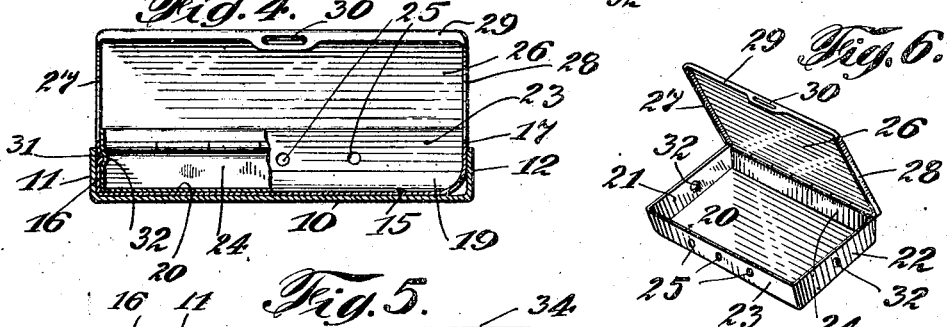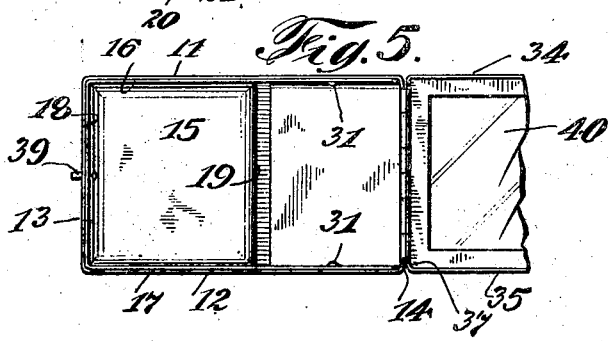

1,647,527

UNITED STATES PATENT OFFICE.

THEODORE KIRBY, OF NEW YORK, N. Y.

POWDER CONTAINER.

Application filed March 18, 1927. Serial No. 176,399.

My invention relates to powder containers and refers particularly to containers adapted for containing loose powder and a powder puff.

One object of my invention is a compact container capable of containing a quantity of loose powder in a compartment with means whereby it may be introduced in desirable small quantities into a compartment containing a powder puff.

Another object of my invention is an arrangement of parts whereby the powder may be retained in its compartment without undesirable sifting therefrom.

Another object of my invention is a powder container in which the arrangement of parts is such that a powder proof closure may be obtained.

The device of my invention accomplishes the above, and other desirable objects as will be evident upon a consideration of my specification and accompanying drawings.

In the accompanying drawings illustrating one form of the device of my invention, similar parts are designated by similar numerals.

Figure 1 is a perspective view of one form of the device of my invention in closed position.

Figure 2 is a top view of Figure 1 in open position.

Figure 3 is a cross-section through the line 3—3 of Figure 1.

Figure 4 is a cross-section through the line 4—4 of Figure 2.

Figure 5 is a broken top view of my device in open position with the powder receptacle removed.

Figure 6 is a perspective view of my powder receptacle in open position.

The particular form of the device of my invention shown in the accompanying drawings comprises a bottom member having the bottom 10, the two up-turned sides 11 and 12, and the two up-turned ends 13 and 14.

Within the bottom member is a tray having the bottom 15, the two sides 16 and 17 and the end 18. The sides 16 and 17 extend slightly above the upper edges of the sides 11 and 12, to form a shoulder therewith for purposes described later. The tray has an upturned end 19 of less height than the sides 16 and 17, this end 19 being formed by cutting the bottom 15 and upturning a portion thereof. The tray thus forms two tray-like compartments, separated from each other by the end 19.

Within the rearward tray-like compartment is a powder receptacle having the bottom 20, the sides 21 and 22 and the ends 23 and 24, the end 23 being inclined with respect to the bottom 20 and having a plurality of openings 25, 25, above the side 19 of the tray. The sides 21 and 22 of the powder receptacle extend above the sides 16 and 17 of the tray for purposes described later.

A cover 26 is hingedly attached to the end 24, the sides 27 and 28 of which extend over and abut upon the outer faces of the sides 21 and 22 and the end 29 of which extends over and abuts upon the outer face of the end 23. The end 29 has a finger-nail indentation 30.

The powder receptacle is retained in position by means of extended members 31, 31 of the sides 16 and 17 fitted into corresponding recesses 32, 32 of the sides 21 and 22.

Hingedly attached to the bottom end 14 is a cover 33 for the device having the extended sides 34 and 35 and the extended ends 36 and 37. A hinged catch 38 carried by the cover end 36 acts with the pin 39 to retain the cover in closed position.

A mirror 40 is carried upon the inner face of the hinged cover 33.

The operation of the device is as follows:—

Loose face powder is placed in the powder receptacle and the cover 26 closed. Due to the movement of the device when carried, a small portion of powder will find its way through the openings 25, 25 into the puff receptacle and below the puff 41 contained therein, and hence the powder is thus supplied to the puff for purposes of application.

It is to be noted that when the cover of the device is in process of closing, the extended sides 21 and 22 act as a guide for the sides 34 and 35 of the cover, and that when the cover is closed the sides 34 and 35 abut upon the shoulder formed by the sides 16, 17 and 11, 12, thus forming a powder proof closure.

I do not limit myself to the particular size, shape, number or arrangement of parts as shown and described as these are given simply as a means for clearly describing the device of my invention.

What I claim is:—

1. In a powder container, in combination, a bottom having upwardly extended sides; a tray having upwardly extended sides within the bottom, the tray sides extending above the bottom sides; a transverse wall dividing the tray into two compartments; a powder receptacle within the rear compartment, the sides of the powder receptacle extending above the tray sides; an end to the powder receptacle having openings into the formed compartment, a cover for the powder and a cover for the device the sides of which abut upon the sides of the powder receptacle cover sides and the tray sides.

2. In a powder container, in combination, a bottom having upwardly extended sides; a tray having upwardly extended sides within the bottom, the tray sides extending above the bottom sides; a transverse wall dividing the tray into two compartments; a powder receptacle within the rear compartment, the sides of the powder receptacle extending above the tray sides; an inclined end to the powder receptacle having openings into the formed compartment, a cover for the powder receptacle, and a cover for the device the sides of which abut upon the sides of the powder receptacle cover sides and the tray sides.

Signed at New York city, in the county of New York and State of New York, this 15th day of March, 1927.

THEODORE KIRBY.